United States Patent
Sen et al.

(10) Patent No.: US 11,208,867 B2
(45) Date of Patent: Dec. 28, 2021

(54) SYSTEM AND DEVICE FOR USE IN PERFORMING REVERSE-CEMENTING OPERATIONS IN DOWNHOLE WELL ENVIRONMENTS

(71) Applicant: Halliburton Energy Services, Inc., Houston, TX (US)

(72) Inventors: Tamal Kumar Sen, Kolkata (IN); Rahul Nandkumar Jadhav, Pune (IN); Ganesh Shriniwas Pangu, Talegaon Dabhade (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/460,720

(22) Filed: Jul. 2, 2019

(65) Prior Publication Data
US 2021/0002975 A1 Jan. 7, 2021

(51) Int. Cl.
*E21B 33/14* (2006.01)
*C09K 8/42* (2006.01)
*E21B 47/005* (2012.01)

(52) U.S. Cl.
CPC ........... *E21B 33/14* (2013.01); *C09K 8/42* (2013.01); *E21B 47/005* (2020.05)

(58) Field of Classification Search
CPC ...... E21B 33/14; E21B 47/005; E21B 47/006; E21B 47/007; E21B 41/00; E21B 33/12; C09K 8/42; C09K 8/467
USPC .................................. 166/424.8, 228, 230
See application file for complete search history.

(56) References Cited

U.S. PATENT DOCUMENTS

| | | | |
|---|---|---|---|
| 3,052,297 A | 9/1962 | Blydorp | |
| 5,494,107 A | 2/1996 | Bode | |
| 6,817,415 B2 * | 11/2004 | Orban | E21B 33/13 166/285 |

(Continued)

FOREIGN PATENT DOCUMENTS

| | | | | |
|---|---|---|---|---|
| GB | 2557797 A | 6/2018 | | |
| WO | WO-2017111777 A1 * | 6/2017 | ............ | C04B 28/02 |

OTHER PUBLICATIONS

Kumbhar, Bhau K., Satyajit R. Patil, and Suresh M. Sawant. "Synthesis and characterization of magneto-rheological (MR) fluids for MR brake application." Engineering Science and Technology, an International Journal 18.3 (2015): 432-438.

(Continued)

*Primary Examiner* — Angela M DiTrani Leff
(74) *Attorney, Agent, or Firm* — McGuire Woods LLP

(57) ABSTRACT

A system for use in performing a reverse cementing operation in a downhole well operation and creating a sectional separation within a well casing and a process completion indicator. The system comprising a well casing, and a magnetic element, and a plurality of magnetizable particles. The magnetic element is coupled with a radial, interior section of the well casing and the plurality of magnetizable particles couple with the magnetic element forming an impediment between a first and second section of the well casing. The impediment creates a detectable resistive force. The magnetizable particles and the at least one magnet form a contiguous and porous wall and the resistive force creates a pressure spike at a surface of the well in response to the interaction of a cement slurry pumped into an annulus of a wellbore and the wall.

17 Claims, 4 Drawing Sheets

(56) References Cited

U.S. PATENT DOCUMENTS

| | | | |
|---|---|---|---|
| 7,303,008 B2 | 12/2007 | Badalamenti et al. | |
| 2003/0029611 A1* | 2/2003 | Owens | E21B 33/14 |
| | | | 166/250.03 |
| 2005/0274524 A1* | 12/2005 | Silguero | E21B 31/06 |
| | | | 166/311 |
| 2009/0020285 A1 | 1/2009 | Chase et al. | |
| 2010/0051275 A1* | 3/2010 | Lewis | C04B 40/0641 |
| | | | 166/286 |
| 2010/0243258 A1* | 9/2010 | Fishbeck | E21B 41/0078 |
| | | | 166/311 |
| 2011/0094742 A1 | 4/2011 | Badalamenti et al. | |
| 2011/0290506 A1 | 12/2011 | Ocalan et al. | |
| 2011/0297394 A1 | 12/2011 | VanDelden | |
| 2016/0010424 A1* | 1/2016 | van Oort | C04B 28/02 |
| | | | 166/293 |
| 2017/0268312 A1* | 9/2017 | Haake | E21B 33/13 |
| 2019/0242208 A1* | 8/2019 | Estrada-Giraldo | E21B 21/003 |

OTHER PUBLICATIONS

International Search Report and Written Opinion dated Mar. 31, 2020; International PCT Application No. PCT/US2019/040560.

* cited by examiner

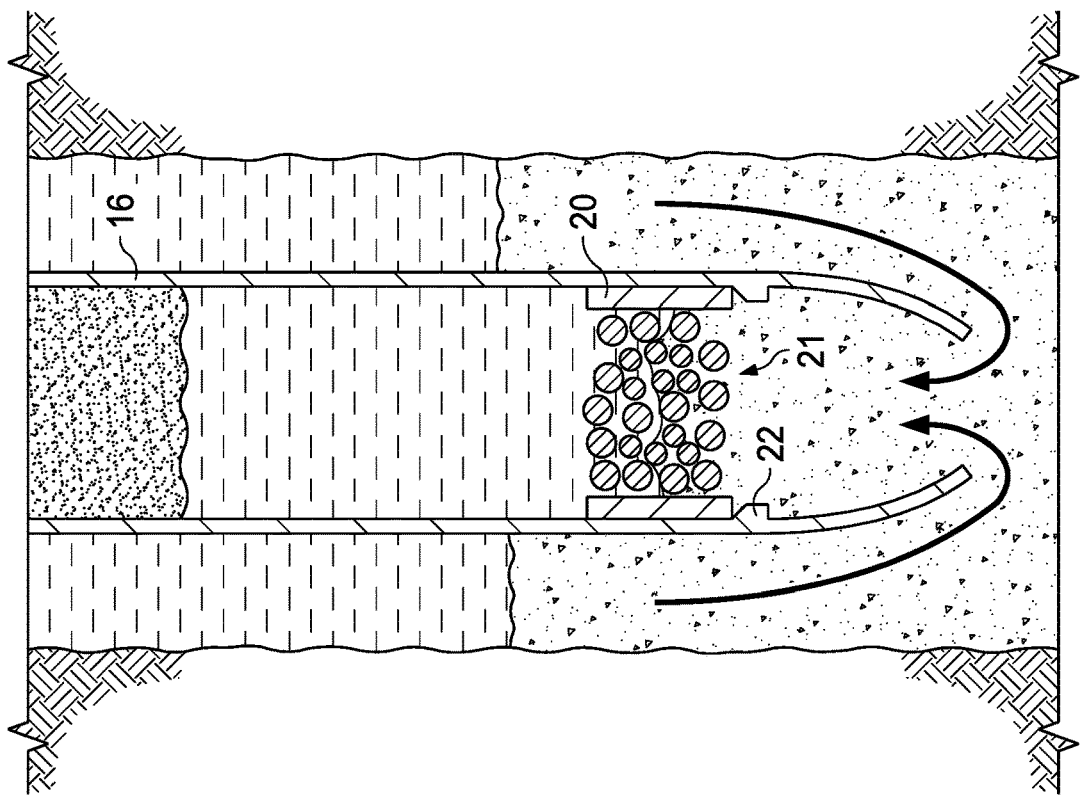
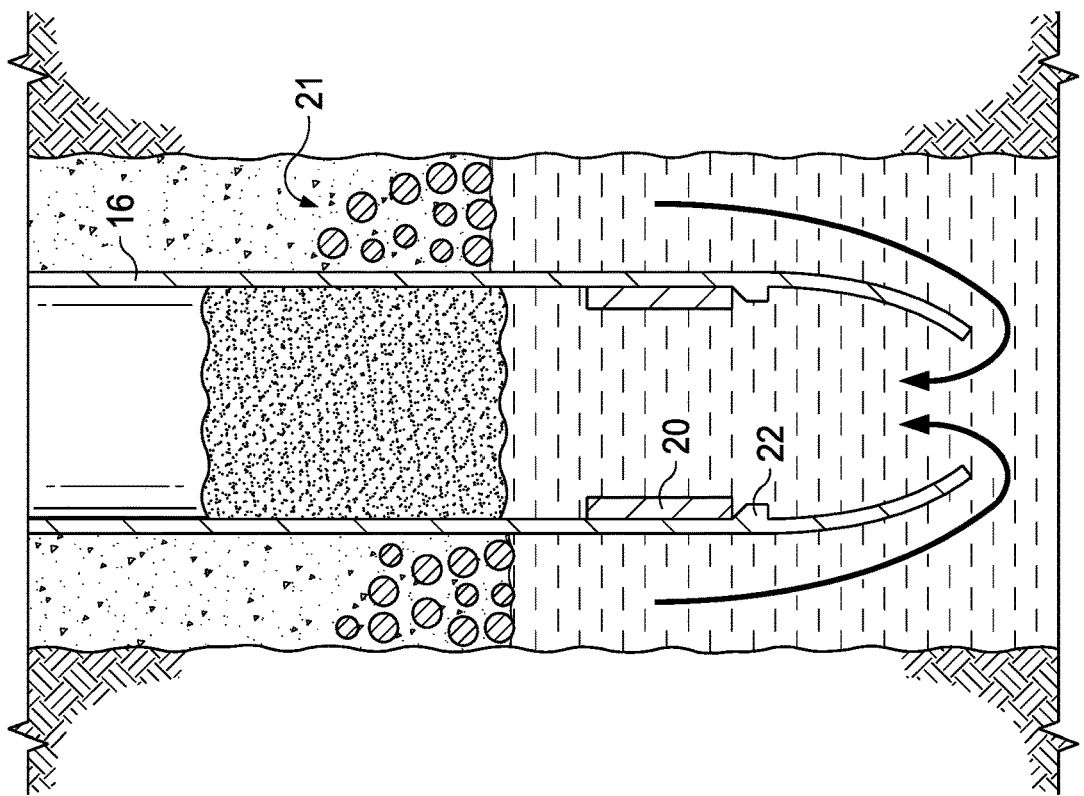

SYSTEM AND DEVICE FOR USE IN PERFORMING REVERSE-CEMENTING OPERATIONS IN DOWNHOLE WELL ENVIRONMENTS

BACKGROUND

In conventional, downhole cementing operations, a top and bottom plug are used to for two purposes: to clean the Internal Diameter (ID) of a well casing; and create a job completion indicator when the top plug hits the bottom plug during displacement. In other words, a pressure spike is created at the surface which serves as indication that the job is complete. However, during a reverse cementing operation, a cement slurry is pumped in the annulus of the wellbore and up into the well casing. It is very difficult for an operator to know when the cement slurry has reached the bottom of the well casing and, therefore, about to enter the casing, as plugs cannot be used in the annulus. If the flow of the cement slurry is not stopped in time, it can enter the casing and can set there during static time and harden. This can affect the efficiency of well site operations. As the hardened cement can render the casing inoperable, time and labor will need to be provisioned to render the pipe operable.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A and 2B are illustrations of the well site where magnetizable particles mixed with the cement slurry are transferred during the pumping stage of the reverse cementing operation to interact with the magnetic ring, in accordance with certain example embodiments;

DETAILED DESCRIPTION

Figure 1:
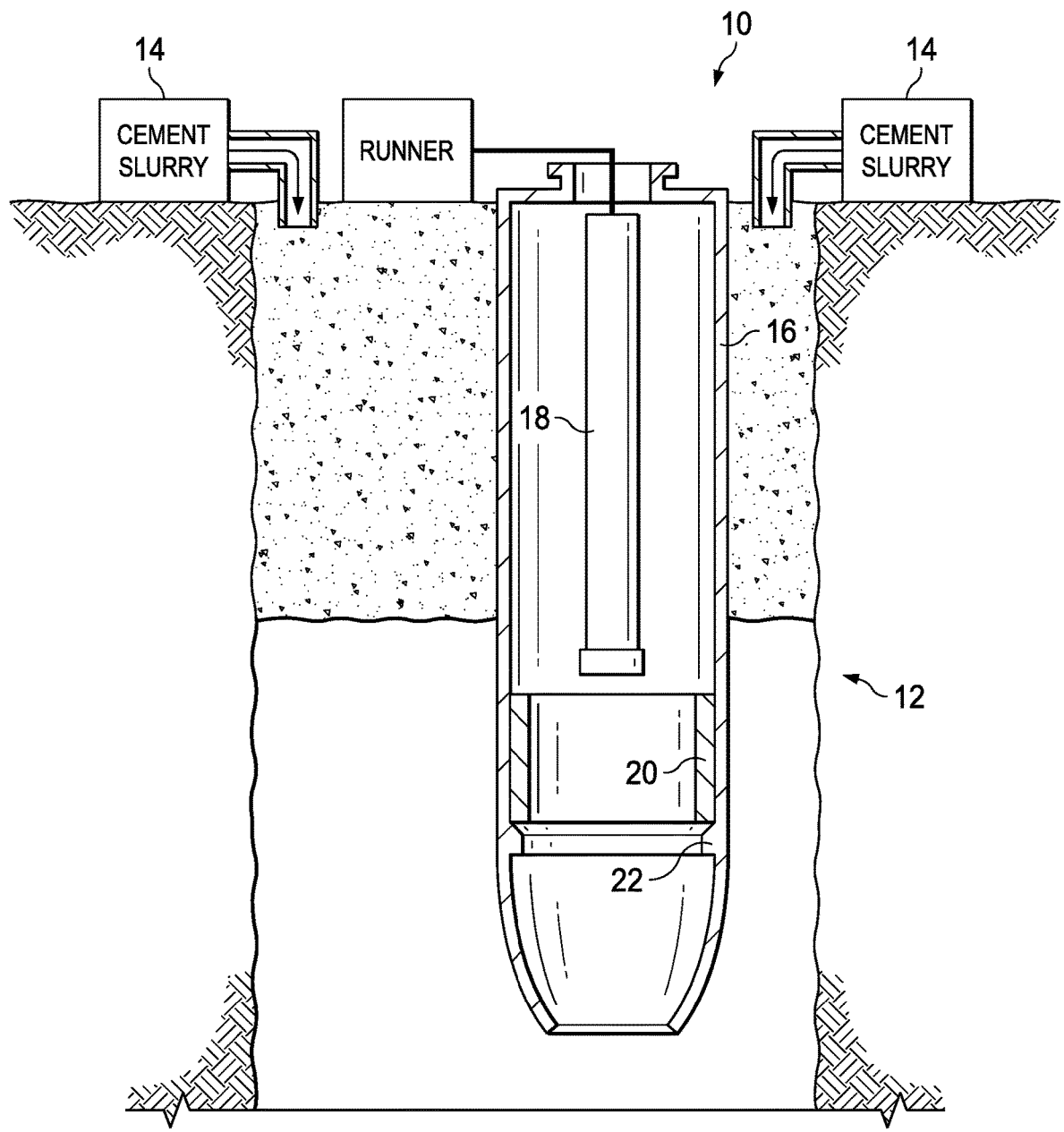
FIG. 1 is an illustration of a diagram of a well site where reverse cementing operations are performed, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The present disclosure discusses a simple and effective way to generate a detectable pressure signal that can serve as an 'end of job indicator' for reverse cementing operations in downhole well operations. In the present disclosure, a device and system are presented that uses an arrangement of magnets, or one magnet, that forms a magnetic ring to generate a magnetic field inside downhole well casing and non-reactive magnetizable particles to create a semi-porous barrier between a first and second section of the well casing. This semi-porous barrier prevents cement slurry from entering one of the sections during the cementing operation and creates a pressure difference and, therefore, pressure spike that can be detected at the surface. The non-reactive magnetizable particles can be suspended either in the last few barrels of spacer and/or in the first few barrels of lead cement slurry. The device and system can reduce or possibly eliminate the possibility of cementing the drilling pipe. By eliminating or reducing this possibility, the operator can save time and money in recovery and maintenance operations.

In case of the magnetic ring, a single magnetic ring can be used or a stacked configuration can be used. The magnetizable particles deposit on the ring and slowly bridge the passage of traversing fluids thereby increasing the resistance for the flow. This manifests in the form of pressure spike at the surface. In an additional embodiment, a magnetic screen augments a combination of the barrier formed by the arrangement of magnets and the magnetized particles. The magnetic screen should have openings small enough to pass normal completion fluids, which are particle-laden. The combination should not pose very high resistance for the flow of completion fluids that enter before the cement slurry. In another embodiment, a magnetic screen, or a plurality of stacked magnetic screens, can be used alone without the magnetic ring. In the case of multiple screens, the screens can be separated using metal separators and the mesh size of the screens can vary. In this case, the magnetizable particles will form a filter-cake by stacking to the magnetic screen. This quickly builds the resistance against further flow and the reactive force creates a pressure spike at the well site surface.

In many scenarios, the magnetic ring, screen, or combination thereof is placed in proximity to drill piping, e.g. just above the float collar. The magnetic field created can be generated by means of permanent magnets, electromagnetics, or a combination thereof. The material of choice for non-reactive magnetizable particles can be from group of Ferromagnetic materials, Paramagnetic materials, diamagnetic materials or a combination thereof. Ferromagnetizable particles can be selected from iron, nickel, cobalt etc. Paramagnetizable particles can include magnesium, molybdenum, lithium etc. Diamagnetizable particles can be from copper, silver etc. These particles should not react with cement slurry and spacer fluid. And, in absence of magnetic field these particles should be compatible with the cement slurry or spacer fluid. However, the particles will respond in presence of external magnetic field and they will align themselves to form a non-porous barrier, sufficient to give a pressure spike at the surface. The suspended magnetizable particles while traversing through a wellbore and entering in the magnetic field will align themselves and increase the viscosity of a the cement slurry and spacer fluid. The load or barrier created by the interaction between the magnets and the magnetizable particles will increase the viscosity of cement slurry/spacer fluid, or it will form semi-porous barrier, sufficient enough to give a pressure spike at the surface.

Referring now to FIG. 1, illustrated is a diagram of a well site where reverse cementing operations are performed, in accordance with certain example embodiments, denoted generally as 10. The well site 10 comprises a wellbore 12 where a cement slurry and spacer can be pumped from pumping stations 14 into an annulus of the wellbore 12. The wellbore 12 comprises a well casing 16 and drilling pipe 18. The well casing 16 further comprises a magnetic ring 20. The magnetic ring 20 is fixed to the ID of the well casing 16 and can completely or partially cover a circumferential area of the ID. During the reverse cementing operation, magnetizable particles 21 combined with the cement slurry or spacer can be transferred through the annulus of the wellbore 10 and into the well casing 16. The magnetic ring 20 can be placed at a strategic location, e.g. above casing shoe 22. In essence, the magnetic ring 20 is placed in a section of the well casing 20 where a section below the magnetic ring 20 needs to be cutoff from the section above the magnetic ring 20 in order to protect the drill pipe 20 from the cement slurry.

Figure 3B:
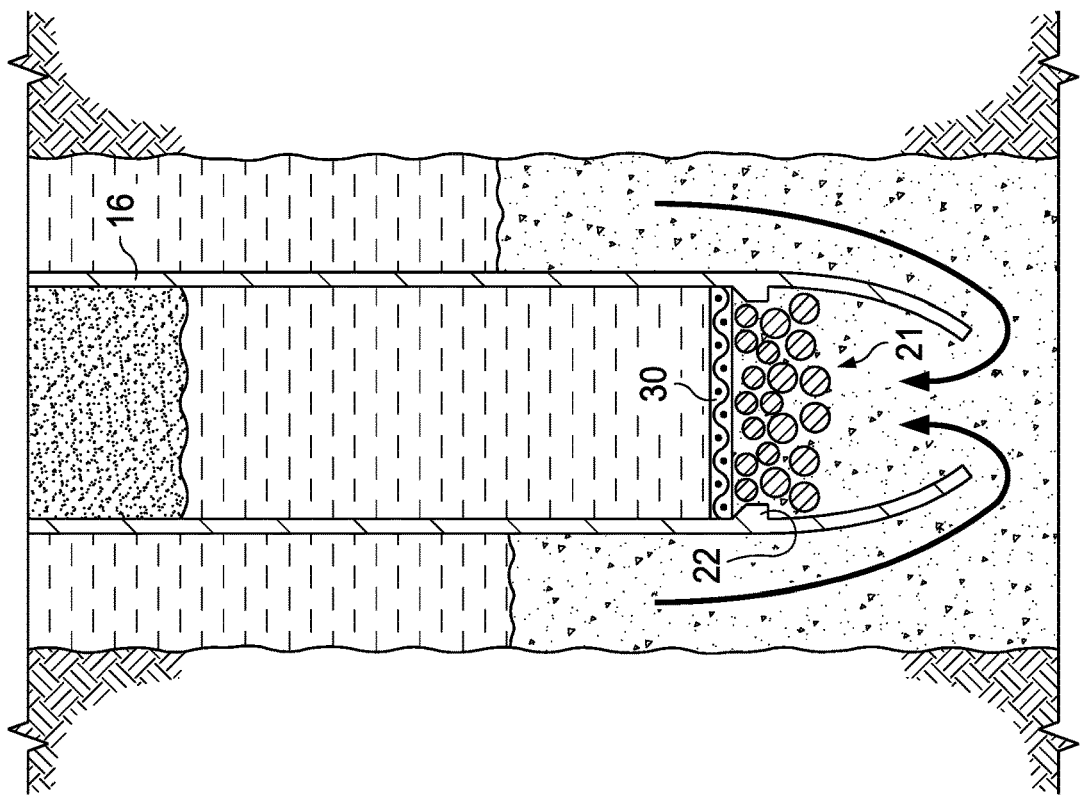
FIGS. 3A and 3B are illustrations of the well site where magnetizable particles mixed with the cement slurry are transferred during the pumping stage of the reverse cementing operation to interact with a magnetic screen fixed to a hanger of the casing, in accordance with certain example embodiments.
Figure 3A:
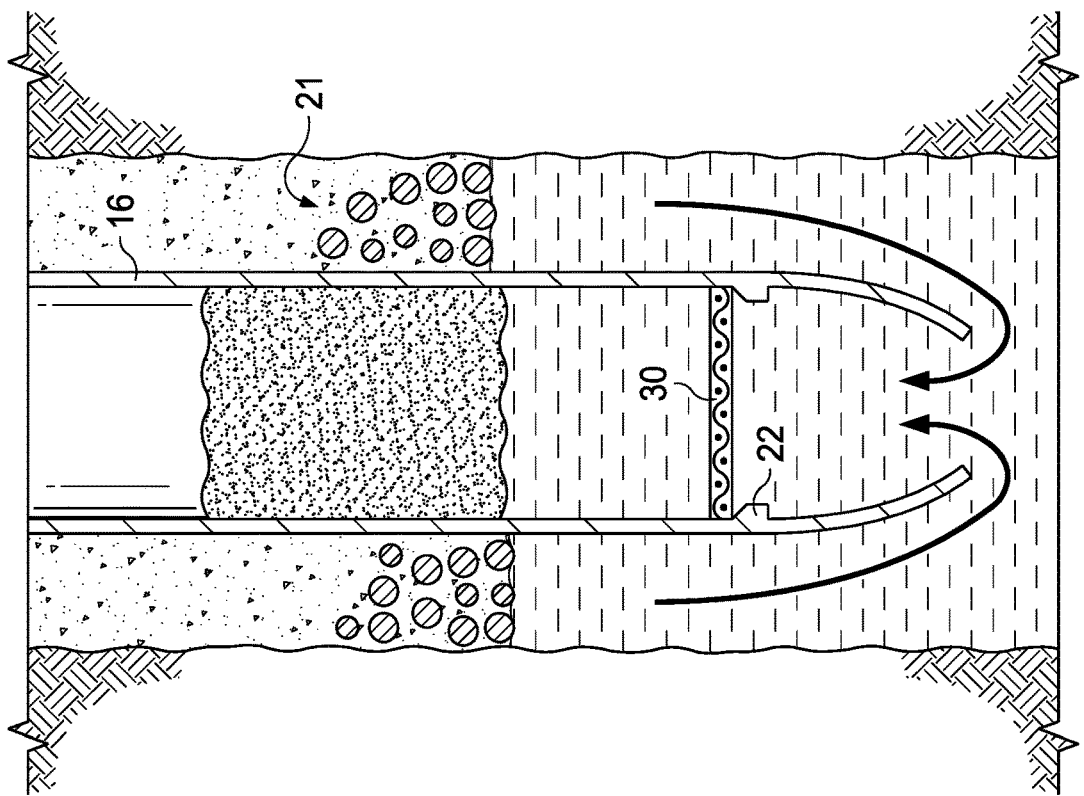
Figure 4B:
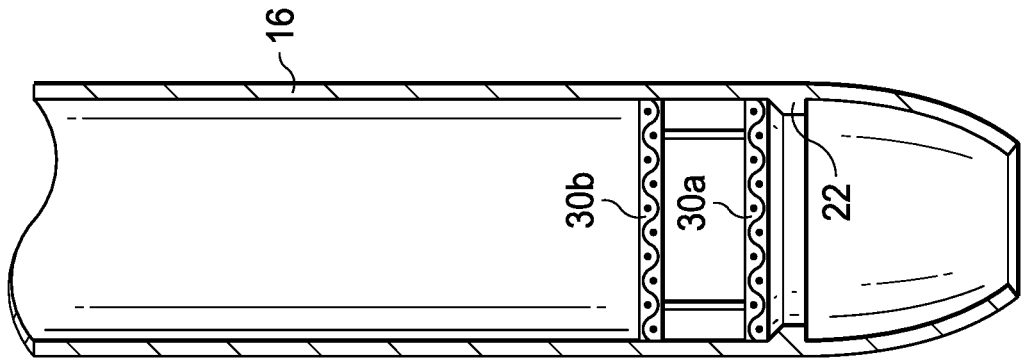
FIGS. 4A and 4B are illustrations of well casing fitted with multiple magnetic rings and multiple screens 30a, 30b, respectively, in accordance with certain example embodiments.
Figure 4A:
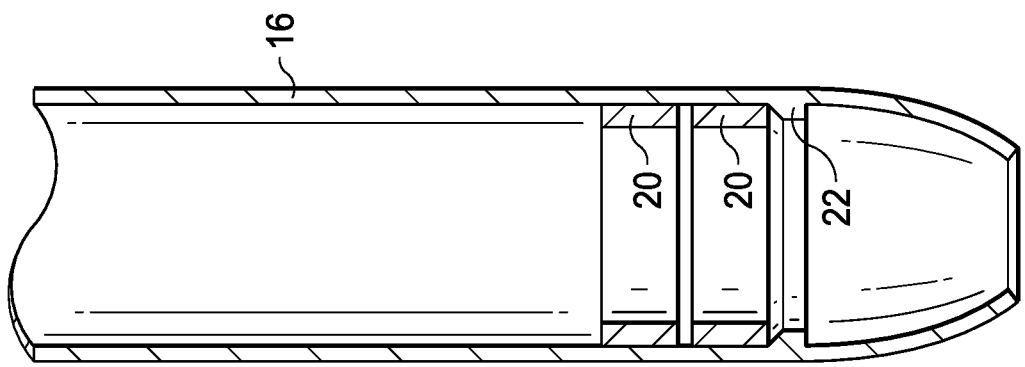

Illustrated in FIGS. 2A and 2B are diagrams of the well site 10 where magnetizable particles mixed with the cement slurry are transferred during the pumping stage of the reverse cementing operation to interact with the magnetic ring 20. The magnetizable particles 21 form a semi-contiguous wall, or stated different a porous wall, within the cement slurry due to their magnetized nature. When this semi-contiguous wall interacts with the magnetic ring 20 a barrier is created between the two sections and a reactive force is created against the cement slurry. The barrier serves two functions: one, to impede the flow of the cement slurry; and, two, create a detectable pressure spike at the surface of the well site 10. Illustrated in FIGS. 3A and 3B are diagrams of the well site 10 where magnetizable particles 21 mixed with the cement slurry are transferred during the pumping stage of the reverse cementing operation to interact with a magnetic screen 30 fixed above the casing shoe 22 of the casing 16. As in the embodiment of FIG. 2, the magnetizable particles 21 form a porous wall within the slurry and after interacting with the screen 30 create a filter-cake. In FIGS. 4A, 4B, illustrated is a well casing fitted with multiple magnetic rings 20 and multiple screens 30a, 30b, respectively. In the latter case, the screens have different mesh configurations.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a system for use in a downhole well operation, the system comprising: a well casing; a magnetic element coupled with a radial, interior section of the well casing; and a plurality of magnetizable particles; wherein the plurality of magnetizable particles couple with the magnetic element forming an impediment between a first and second section of the well casing; wherein the impediment creates a detectable resistive force;

Clause 2, the system of clause 1 wherein the magnetic element comprises at least one magnet that forms a ring around a circumference of the interior section of the well casing;

Clause 3, the system of clause 1 further comprising a first at least one magnet and a second at least one magnet with each forming a ring around a circumference of the interior section of the well casing;

Clause 4, the system of clause 1 wherein the magnetic element comprises a magnetic screen having a mesh design;

Clause 5, the system of clause 4 wherein the magnetic element further comprises another magnetic screen having a different mesh design;

Clause 6, the system of clause 1 wherein the magnetizable particles have at least one of a rounded, squared, triangle, needle, cylindrical, fibrous, and sheet like shape;

Clause 7, the system of clause 1 wherein the magnetizable particles and the magnetic element form a contiguous and porous wall;

Clause 8, the system of clause 1 wherein the resistive force creates a pressure spike at a surface of a well;

Clause 9, the system of clause 1 wherein the well operation is a reverse cementing operation;

Clause 10, an apparatus for creating a sectional separation within a well casing and a process completion indicator, the apparatus comprising: a magnetic element coupled with a radial, interior section of the well casing; and a plurality of magnetizable particles; wherein the plurality of magnetizable particles couple with the magnetic element forming an impediment between a first and second section of the well casing; wherein the impediment creates a detectable resistive force;

Clause 11, the apparatus of clause 10 wherein the magnetic element comprises at least one magnet that forms a ring around a circumference of the interior section of the well casing;

Clause 12, the apparatus of clause 11 further comprising a first at least one magnet and a second at least one magnet with each forming a ring around a circumference of the interior section of the well casing;

Clause 13, the apparatus of clause 10 wherein the magnetic element comprises a magnetic screen having a mesh design;

Clause 14, the apparatus of clause 10 wherein the magnetic element further comprises another magnetic screen having a different mesh design;

Clause 15, the apparatus of clause 10 wherein the magnetizable particles have at least one of a rounded, squared, triangle, needle, cylindrical, fibrous, and sheet like shape;

Clause 16, the apparatus of clause 10 wherein the magnetizable particles and the magnetic element form a contiguous and porous wall;

Clause 17, the apparatus of clause 10 wherein the resistive force creates a pressure spike at a surface of a well;

Clause 18, a method of performing a reverse cementing operation in a downhole well environment, the method comprising: pumping cement into an annulus of a wellbore and into an opening of a well casing; detecting a pressure spike at a surface of the wellbore; wherein the wellbore comprises: a magnetic element coupled with a radial, interior section of the well casing; and a plurality of magnetizable particles; wherein the plurality of magnetizable particles couple with the magnetic element forming an impediment between a first and second section of the well casing; wherein the impediment creates a detectable resistive force;

Clause 19, the method of clause 18 wherein the magnetizable particles and the magnetic element form a contiguous and porous wall; and Clause 20, the method of clause 18 wherein the resistive force creates a pressure spike at a surface of a well.

What is claimed is:

1. A system for use in a reverse cementing operation of a downhole well environment to create a process completion indicator and a protection barrier, the downhole well environment having a wellbore annulus with cement slurry in a well, the system comprising:
    a well casing;
    a drill pipe within the well casing;
    a casing shoe having a cement slurry with a spacer fluid and a plurality of magnetized particles therein;
    a magnetic element fixed to a circumferential section of an interior section of the well casing above the casing shoe, the circumferential section extending at least half of the interior section;
    a protection and process completion indicator barrier comprising the magnetic element and the plurality of magnetized particles;
    wherein the magnetic element and the plurality of magnetized particles form the protection and process completion indicator barrier and separate a section above the magnetic element from a section below the magnetic element; and
    wherein the protection and process completion indicator barrier creates an impediment against the cement slurry traversing into the section above the magnetic element, the impediment creating a detectable resistive force and protecting the drill pipe in the section above the magnetic element from the cement slurry.

2. The system of claim 1 wherein the magnetic element comprises at least one magnet that forms a ring around a circumference of the interior section of the well casing.

3. The system of claim 1 wherein the magnetic element comprises a first at least one magnet and a second at least one magnet with each forming a ring around a circumference of the interior section of the well casing.

4. The system of claim 1 wherein the magnetic element comprises a magnetic screen having a mesh design.

5. The system of claim 4 wherein the magnetic element further comprises another magnetic screen having a different mesh design.

6. The system of claim 1 wherein the magnetized particles have at least one of a rounded, squared, triangle, needle, cylindrical, fibrous, and sheet shape.

7. The system of claim 1 wherein the resistive force creates a pressure spike at a surface of the well.

8. An apparatus for creating a sectional separation within a well casing and a process completion indicator and a protection barrier in a well, the apparatus comprising:
    a drill pipe within the well casing;
    a casing shoe having a cement slurry with a spacer fluid and a plurality of magnetized particles therein;
    a magnetic element fixed to a circumferential section of an interior section of the well casing above the casing shoe, the circumferential section extending at least half of the interior section;
    a protection and process completion indicator barrier comprising the magnetic element and the plurality of magnetized particles; and
    wherein the magnetic element and the plurality of magnetized particles form the protection and process completion indicator barrier and separate a section above the magnetic element from a section below the magnetic element; and
    wherein the protection and process completion indicator barrier creates an impediment against the cement slurry traversing into the section above the magnetic element, the impediment creating a detectable resistive force and protecting the drill pipe in the section above the magnetic element from the cement slurry.

9. The apparatus of claim 8 wherein the magnetic element comprises at least one magnet that forms a ring around a circumference of the interior section of the well casing.

10. The apparatus of claim 8 wherein the magnetic element comprises a first at least one magnet and a second at least one magnet with each forming a ring around a circumference of the interior section of the well casing.

11. The apparatus of claim 8 wherein the magnetic element comprises a magnetic screen having a mesh design.

12. The apparatus of claim 11 wherein the magnetic element further comprises another magnetic screen having a different mesh design.

13. The apparatus of claim 8 wherein the magnetized particles have at least one of a rounded, squared, triangle, needle, cylindrical, fibrous, and sheet shape.

14. The apparatus of claim 8 wherein the resistive force creates a pressure spike at a surface of the well.

15. A method of performing a reverse cementing operation in a downhole well environment, the method comprising:
    placing a drill pipe in well casing in a well;
    pumping a cement slurry into an annulus of a wellbore and into a casing shoe, the casing shoe attached to the well casing, wherein a magnetic element is fixed to a circumferential section of an interior section of the well casing, the circumferential section extending at least half of the interior section;
    mixing the cement slurry with spacer fluid and a plurality of magnetized particles in the casing shoe;
    creating a protection and process completion indicator barrier with the magnetized particles, the protection barrier created above the casing shoe and below the drill pipe;
    creating a pressure spike in the downhole well environment by continuing to pump cement slurry into the annulus; and
    detecting the pressure spike at a surface of the wellbore;
    wherein the plurality of magnetized particles couple with the magnetic element and the cement slurry, spacer fluid, and the magnetized particles form the protection and process completion indicator barrier, separating a section above the magnetic element from a section below the magnetic element; and wherein the protection and process completion indicator barrier creates an impediment against the cement slurry traversing into the section above the magnetic element, the impediment causing a detectable resistive force and protecting the drill pipe in the section above the magnetic element from the cement slurry.

16. The method of claim 15 wherein the resistive force creates the pressure spike at a surface of the well.

17. The method of claim 15 further comprising placing the magnetic element at a predetermined location of the well casing.

\* \* \* \* \*